United States Patent [19]

Ichida

[11] 3,755,617

[45] Aug. 28, 1973

[54] SUB-CARRIER SIGNAL GENERATING SYSTEM HAVING PHASE COMPENSATOR AND UTILIZING VIR SIGNALS

[75] Inventor: Takeshige Ichida, Kadoma City, Osaka, Japan

[73] Assignee: Matsushita Electric Industrial Company, Osaka, Japan

[22] Filed: Dec. 14, 1971

[21] Appl. No.: 207,752

[30] Foreign Application Priority Data

Dec. 18, 1970 Japan .............................. 45/114646
Dec. 25, 1970 Japan .............................. 45/125577

[52] U.S. Cl. ....................... 178/5.4 HE, 178/5.4 SY
[51] Int. Cl. ............................................. H04n 9/46
[58] Field of Search .................... 178/5.4 R, 5.4 SY, 178/5.4 HE, 5.4 TE

[56] References Cited

UNITED STATES PATENTS 3,679,816 7/1972 Avins et al. .................. 178/5.4 HE
3,673,320 6/1972 Carnt et al. .................. 178/5.4 HE

*Primary Examiner*—Robert L. Richardson
*Attorney*—John Lezdey

[57] ABSTRACT

A sub-carrier signal generator for use with a television receiver in the NTSC system for receiving a color signal including the vertical interval color reference (VIR) signal. The sub-carrier signal generator comprises means for generating a sub-carrier signal synchronized with the burst signal in the color signal, means for phase-detecting the VIR signal by using the burst signal to produce a compensation signal representing phase difference between the chrominance reference bar in the VIR signal and the burst signal, and means for compensating the phase of the sub-carrier signal by the compensation signal.

2 Claims, 12 Drawing Figures

THE VIR SIGNAL

INVENTOR
TAKESHIGE ICHIDA
BY John Lezdey
ATTORNEY

INVENTOR
TAKESHIGE ICHIDA
BY John Lezdey
ATTORNEY

INVENTOR
TAKESHIGE ICHIDA
BY John Langley
ATTORNEY

Fig. 4-(1)
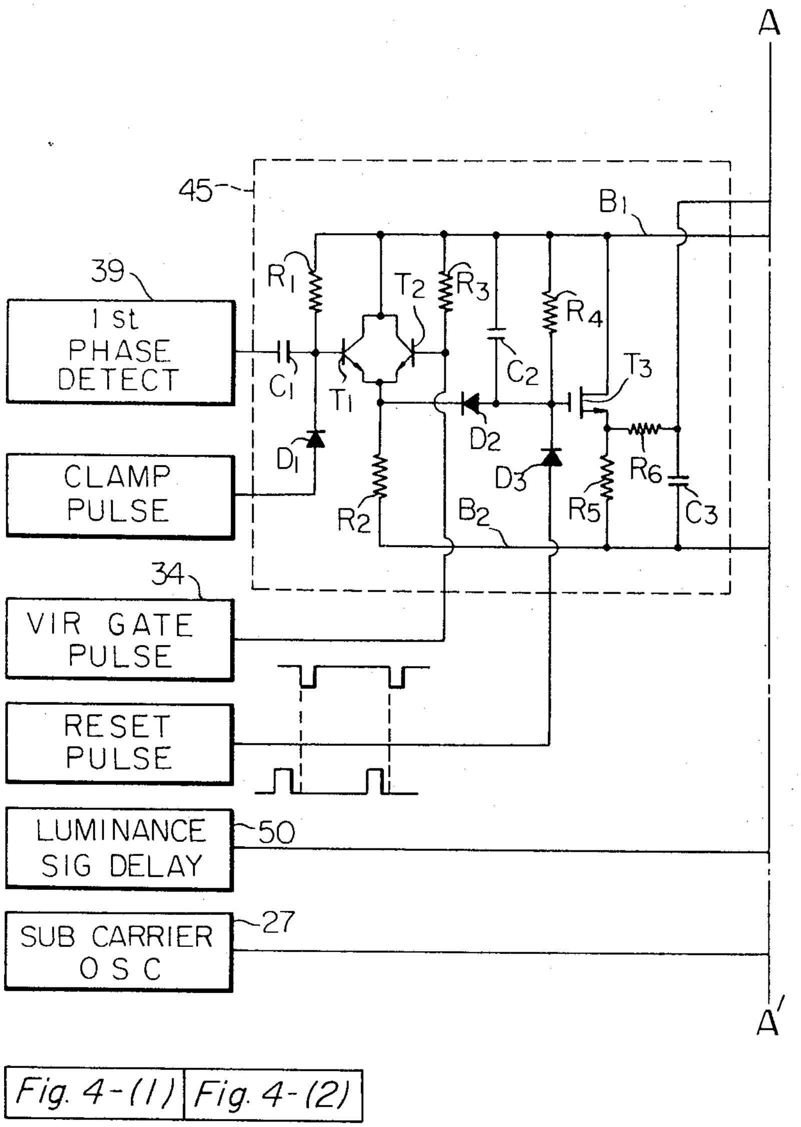
INVENTOR
TAKESHIGE ICHIDA
BY John Lezdey
ATTORNEY

Fig. 4-(2)
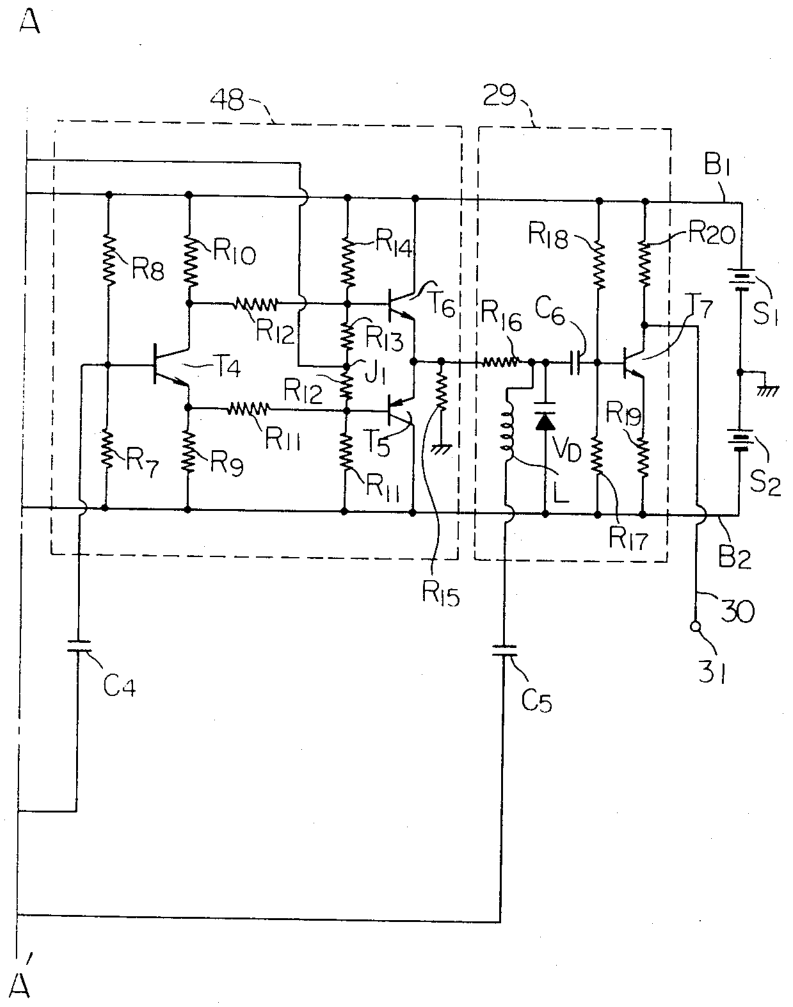
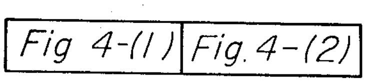
INVENTOR
TAKESHIGE ICHIDA
BY John Lezdey
ATTORNEY

SUB-CARRIER SIGNAL GENERATING SYSTEM HAVING PHASE COMPENSATOR AND UTILIZING VIR SIGNALS

This invention relates to color television receivers and more particularly to a sub-carrier signal generating system of a color television receiver in the NTSC system. The specific purpose of this invention is to provide a simple and reliable sub-carrier signal generating system that will produce a sub-carrier signal having a extremely correct phase.

The color video signal presently broadcasted in the NTSC color television broadcasting system includes a vertical interval color reference signal (abbreviated to VIR signal in this specification) positioned within a twentieth horizontal scanning period in the fly-back period. This VIR signal is utilized for supervising and compensating phase and amplitude distortion of color signals invited in transmission lines or tandem stations. The VIR signal includes a high frequency component which is called chrominance reference bar. The chrominance reference bar has the same phase and amplitude as the burst signal but a different luminance level from that of the burst signal. The system of this invention generally includes a phase detector for phase detecting the VIR signal by using the burst signal and a compensator for compensating the phase of the subcarrier generated therein by using the output signal of the phase detector.

The specific structure of this invention will be understood when the detailed description is read in conjunction with the drawings wherein.

Figure 2:
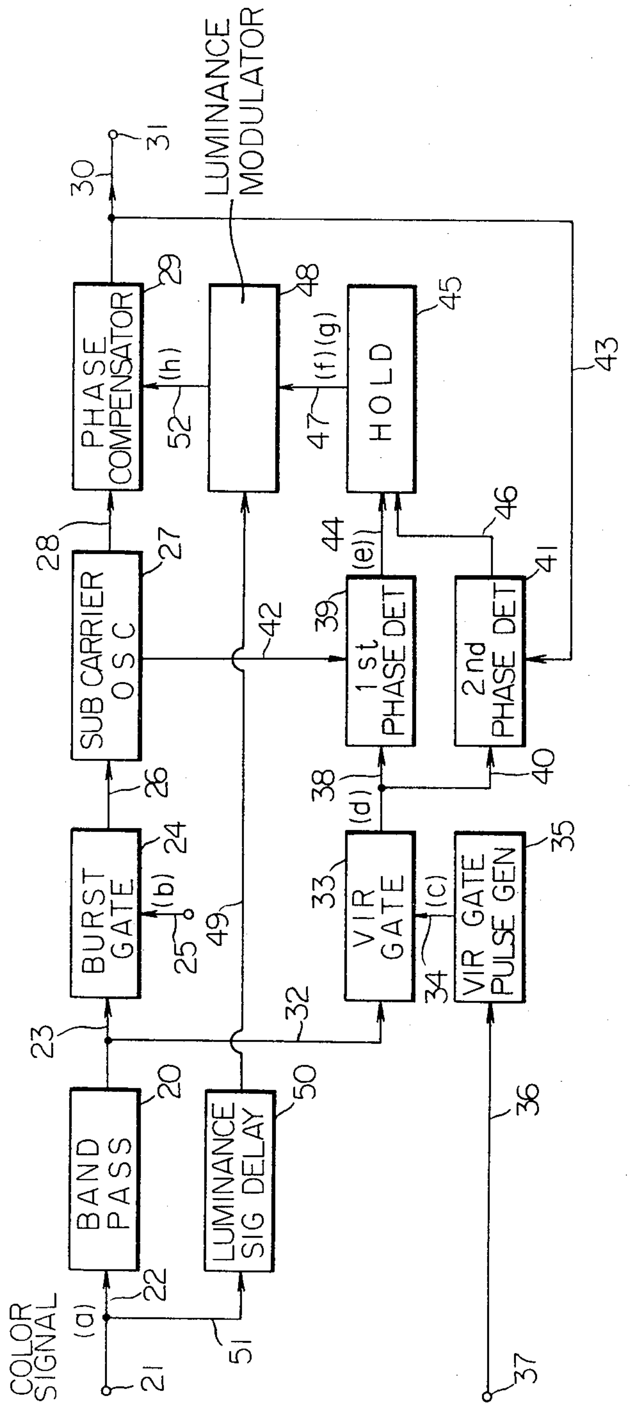
FIG. 2 is a block diagram of a sub-carrier signal generating system according to this invention.
Figures 3A, 3B, 3C, 3D, 3E, 3F, 3G, 3H:
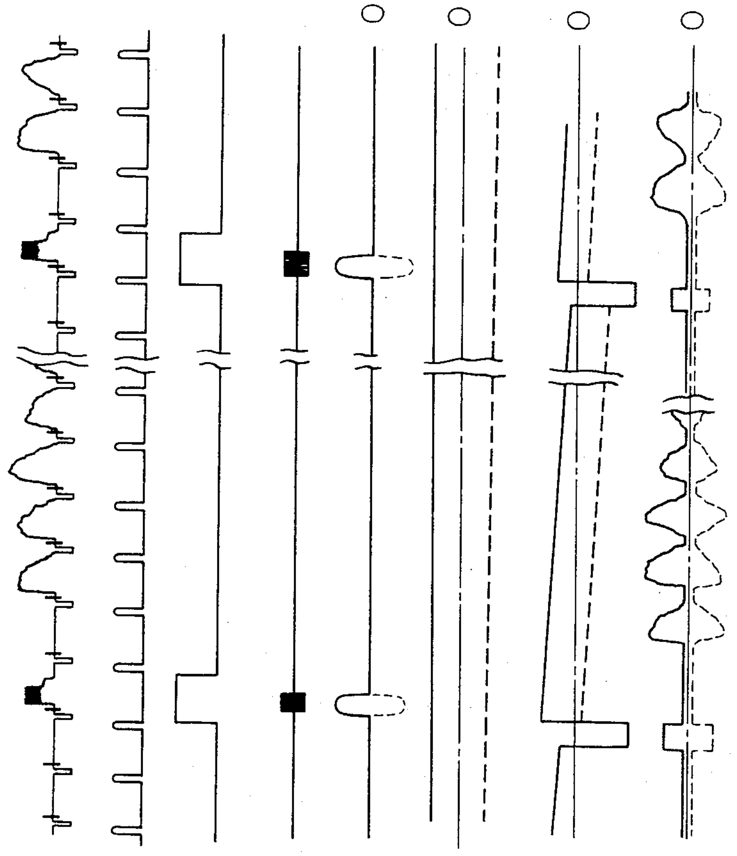

FIGS. 3(*a*) through 3(*h*) are diagrams illustrating waveforms appearing in the sub-carrier generating system of FIG. 2; and FIGS. 4–(1) and 4–(2) are diagrams of a part of the system of FIG. 2.

Figure 1:
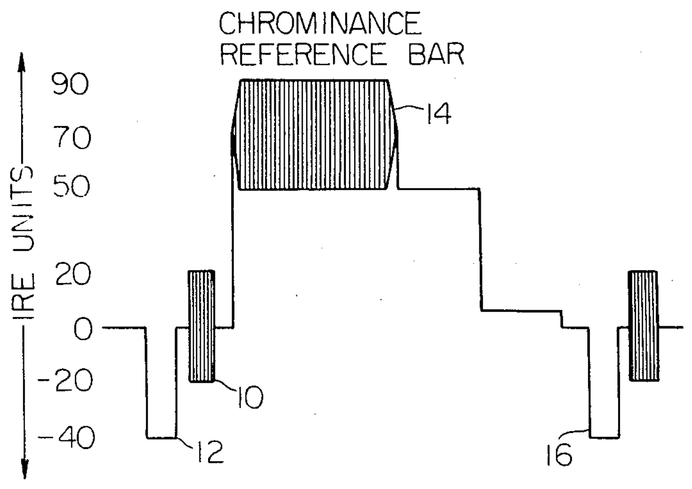
FIG. 1 is a diagram illustrating the VIR signal superposed on a color video signal in the NTSC system.

In FIG. 1, a part of the color television video signal presently employed is shown, which includes a burst signal 10 positioned at the back porch of a horizontal synchronizing pulse 12 in a fly-back time period. A VIR signal having a high frequency component 14, that is the chrominance reference bar, is superposed on the video signal so as to locate within a horizontal scanning time defined by the horizontal synchronizing pulse 12 and another synchronizing pulse 16 succeeding the pulse 12. It is now to be noted that the luminance level of the chrominance reference bar 14 is higher than that of the burst signal 10. It is therefore possible to detect the differential phase in the transmission line by comparing the phases of the chrominance reference bar with the burst signal.

Referring now to FIG. 2, a preferred sub-carrier generating system according to this invention comprises a bandpass filter 20 which passes therethrough a chrominance signal included by a color video signal applied through a color video signal input terminal 21 and a line 22. An output of the bandpass filter 20 is connected through a line 23 to an input of a burst gate 24. The burst gate 24 is adapted to open its gate when a flyback pulse is applied to another input terminal of the gate 24 through a line 25. An output of the gate 24 is connected through a line 26 to an input of a sub-carrier oscillator 27 having an output terminal connected through a line 28 to an input terminal of a phase compensator 29. An output of the compensator 29 is connected through a line 30 to an output terminal 31. The output of the bandpass filter 20 is connected through a line 32 to an input of a VIR gate 33. Another input of the VIR gate 33 is connected through a line 34 to an output of a VIR gate pulse generator 35. An input of the VIR gate pulse generator 35 is connected through a line 36 to a synchronizing pulse input terminal 37. An output of the VIR gate 31 is connected through a line 38 to a first phase detector 39 and through a line 40 to an input of a second phase detector 41. A second input of the first phase detector 39 is connected through a line 42 to a second output of the sub-carrier oscillator 27. A second input of the second phase detector 41 is connected through a line 43 to an output of the phase compensator 29. An output of the first phase detector 39 is connected through a line 44 to a first input of a holding and smoothing circuit 45. An output of the second phase detector 41 is connected through a line 46 to a second input of the holding and smoothing circuit 45. An output of the holding and smoothing circuit 45 is connected through a line 47 to a first input of a luminance modulator 48. A second input of a modulator is connected through a line 49 to an output of a luminance signal delay circuit 50. An input of the luminance signal delay circuit is connected through a line 51 to the input terminal 21. An output of the luminance modulator 48 is connected through a line 52 to a second input of the phase compensator 29.

The operation of the system of FIG. 2 is herein below explained in conjunction with FIG. 3.

When a color video signal as shown in FIG. 3(*a*) is applied through the input terminal 21 and the line 22 to the bandpass filter 20 passes therethrough only chrominance signal. The chrominance signal passed through the filter 20 is applied through the line 23 to the burst gate 24, which then passes only the burst signal in the chrominance signal when energized by a flyback pulse signal as shown in FIG. 3(*b*). The burst signal passed through the gate 24 is applied through the line 26 to the sub-carrier oscillator which then produces a sub-carrier signal synchronized with the burst signal. The sub-carrier signal from the oscillator 27 is applied through the line 28 to the phase compensator 29. The phase compensator compensates the phase of the subcarrier in accordance with a compensation signal through the line 52 and produces the thus compensated sub-carrier signal on the line 31.

A horizontal synchronizing pulse signal is, on the other hand, applied through the terminal 37 and through the line 36 to the VIR gate pulse generator 35. The VIR gate pulse generator 35 then produces VIR gate pulse signal as shown in FIG. 3(*c*) upon receipt of a twentieth of the horizontal synchronizing pulse appearing within the vertical fly-back time. The VIR gate pulse signal is applied through the line 34 to the VIR gate 33 which is then passes therethrough the VIR signal from the bandpass filter 20. The VIR signal passed through the gate 31 includes the chrominance reference bars shown in FIG. 3(*d*). The VIR signal is then applied through the line 38 to the first phase detector 39, which phase-detects the VIR signal by using the subcarrier signal through the line 42 so as to produce a phase difference signal as shown in FIG. 3(*e*), which represents difference between the phases of the chrominance reference bar and the sub-carrier signal. The phase difference signal may have a positive polarity shown by a solid line when the phase of the chromiance reference bar is leading to that of the sub-carrier signal. The phase difference signal, on the contrary, has a negative polarity shown by a dotted line when the phase of the chrominance reference bar is lagging from that of the sub-carrier signal. The phase difference signal is then applied through the line 44 to the holding and smoothing circuit 45 which is then produces a compensation signal having a voltage proportional to the amplitude of the phase difference signal and maintained substantially constant throughout every field time period as shown in FIG. 3(*f*). When, in this instance, a charging and discharging circuit is employed for the holding and smoothing circuit, the output of the circuit may have a waveform in FIG. 3(*g*).

The compensation signal is applied through the line 47 to the luminance modulator 48 which modulates the compensation signal by the delayed luminance signal from the luminance signal delay circuit 50. The modulated compensation signal shown in FIG. 3(*h*) is applied through the line 52 to the phase compensator 29 which produces the compensated sub-carrier signal through the line 28.

The compensated sub-carrier signal may be employed for demodulating the color differential signals. In this instance, it should be noted that since the differential phase of the sub-carrier signal is approximately proportional to the amplitude of the sub-carrier signal, the modulation of the compensation signal by the modulator 48 is desirable. If, however, the simplicity of the circuit is desired, the luminance signal delay circuit 50 and the modulator 48 may be omitted. Since the luminance level of the chrominance reference bar is relatively high, the compensation performed by the phase compensator 29 is considerably effective even if the luminance modulator 48 is omitted.

The second phase detector 41 is adapted to phase-detect the VIR signal by the compensated sub-carrier signal on the line 30 so as to prevent insufficient or excessive compensation. The output signal is applied through the line 46 to the hold circuit 45.

FIG. 4 shows a circuit arrangement of the holding circuit 45, modulator 48 and compensator 29.

The phase difference signal of the first phase detector 39 is applied through a capacitor $C_1$, to a base of a transistor $T_1$ and at the same time a clamp pulse train is applied through a diode $D_1$, so as to clamp the phase difference signal at a predetermined level. This clamp pulse train may be obtained through wave-shaping of the fly-back pulse train generated by the fly-back transformer. A negative gate pulse train of the VIR gate pulse generator 34 is, on the other hand, applied to a base of a transistor $T_2$. Therefore, the phase difference signal is passed through $D_2$ to a capacitor $C_2$ so that the capacitor $C_2$ stores therein an amount of charge proportional to the amplitude of the phase difference signal. Although the charge is discharged through a high resistive resistor $R_4$, the potential at a base of a transistor $T_3$ of high input impedance is substantially maintained constant until the charge in the capacitor $C_2$ is discharged by a reset pulse train through a diode $D_3$. The vertical synchronizing pulse signal may be used as this reset pulse train. The voltage signal on the base of the transistor $T_2$ appears at an emitter of the transistor $T_2$ and thereafter smoothed by a smoothing circuit of a resistor $R_6$ and a capacitor $C_3$. The smoothed signal is regulated by changing the clamp level of the transistor $T_1$ so as to have either a negative or positive polarity in accordance with the phase difference signal from the first phase detector 39.

The delayed luminance signal from the luminance signal delay 50 is applied through a capacitor $C_4$ to a base of a transistor $T_4$ in the modulator 48. The luminance signal is amplified by the transistor $T_4$, and appears at an emitter of the transistor $T_4$. The luminance signal is, on the other hand, inverted and appears at a collector of the transistor $T_4$. The luminance signal and the inverted luminance signal are respectively applied to bases of transistors $T_5$ and $T_6$ which form a complementary amplifier. The transistor $T_5$ is constantly biased to be conductive. When the smoothed signal applied to the joint $J_1$ is positive, a bias current through the transistor $T_6$ increases and, on the contrary, a bias current of the transistor $T_5$ decreases, whereby a positive modulated signal appears across a load resistor $R_{15}$. When the smoothed signal is negative, a negative modulated signal appears across the resistor $R_{15}$. It should be understood that the current amplification factors of the transistors $T_5$ and $T_6$ are respectively proportional to the amplitude of the smoothed signal applied to the joint $J_1$, so that, the modulated signal appearing across the load resistor $R_{15}$ is dependent upon the amplitude and polarity of the smoothed signal at the joint $J_1$.

The modulated signal from the modulator 48 is delivered through a resistor $R_{16}$ of the phase compensator 29. The modulated signal through the resistor $R_{16}$ is applied to a cathode of a varactor diode VD so as to vary the capacitance of the diode VD. The sub-carrier signal from the sub-carrier signal oscillator 27 is applied through a capacitor $C_5$ to an inductance L, whereby the sub-carrier signal is phase-shifted by a phase shifting circuit constituted by the inductance L and the diode VD. The phase-shifted sub-carrier signal is amplified by the transistor $T_7$ and thereafter appears on the line 30.

It should be apparent from the above detailed description that an improved sub-carrier generating system has been provided.

It will be understood that the invention is not to be limited to the exact construction shown and described and that various changes and modifications may be made without departing from the spirit and scope of the invention, as defined in the appended claims.

What is claimed is:

1. Color phase correction apparatus for a color television system having VIR gate and burst signal gate which comprises;

- a subcarrier oscillator for producing an output signal in accordance with a burst signal,
- a phase compensator for producing a corrected signal in response to an output from the oscillator and a difference signal,
- a first phase detector for producing an output signal in accordance with comparison between an output from the oscillator and a VIR gate output,
- a second phase detector connected to the output of VIR gate for producing a compensating signal in response to output from said gate and feedback signal from said compensator,
- hold means connected between said first and second phase detectors and phase compensator for keeping the signals from said phase detectors to the compensator for a predetermined time.

2. Apparatus according to claim 1, wherein a luminance modulator means is connected between said compensator and hold means so as to modulate the difference signal with the luminance signal.

* * * * *